(12) United States Patent
Elfwing et al.

(10) Patent No.: US 9,487,244 B2
(45) Date of Patent: Nov. 8, 2016

(54) STRUCTURAL COMPONENT AND A METHOD OF MANUFACTURING SUCH A COMPONENT

(71) Applicant: VOLVO CAR CORPORATION, Gothenburg (SE)

(72) Inventors: Jens Elfwing, Torslanda (SE); Martin Gustavsson, Torslanda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/819,748

(22) Filed: Aug. 6, 2015

(65) Prior Publication Data

US 2016/0046330 A1   Feb. 18, 2016

(30) Foreign Application Priority Data

Aug. 15, 2014   (EP) .................................... 14181170

(51) Int. Cl.
| | |
|---|---|
| B62D 21/02 | (2006.01) |
| B62D 27/02 | (2006.01) |
| B62D 65/02 | (2006.01) |
| B23K 11/11 | (2006.01) |
| B23K 26/22 | (2006.01) |
| B60B 25/00 | (2006.01) |

(52) U.S. Cl.
CPC ............... *B62D 27/02* (2013.01); *B23K 11/11* (2013.01); *B23K 26/0622* (2015.10); *B23K 26/22* (2013.01); *B60B 25/002* (2013.01); *B62D 21/02* (2013.01); *B62D 65/02* (2013.01)

(58) Field of Classification Search
CPC .... B62D 27/02; B62D 27/023; B62D 21/02; B62D 65/02; B23K 26/0622; B23K 11/11
USPC .......................................................... 296/29
See application file for complete search history.

(56) References Cited

U.S. PATENT DOCUMENTS

| | | | |
|---|---|---|---|
| 1,690,377 A | 11/1928 | Pugh | |
| 6,010,155 A * | 1/2000 | Rinehart | B62D 21/02 280/781 |
| 6,099,194 A * | 8/2000 | Durand | B62D 21/02 296/204 |
| 2002/0162224 A1* | 11/2002 | Gabbianelli | B21D 26/033 29/897.2 |

(Continued)

FOREIGN PATENT DOCUMENTS

JP   2012071625 A   4/2012

OTHER PUBLICATIONS

Extended European Search Report Dated Feb. 17, 2015, Application No. 14181170.3-1702, Applicant Volvo Car Corporation, 4 Pages.

*Primary Examiner* — Gregory Blankenship
(74) *Attorney, Agent, or Firm* — Brooks Kushman P.C.

(57) ABSTRACT

A structural component for a motor vehicle comprises first and second profiled sheet metal parts joined together by welding spots, which sheet metal parts have opposing free ends arranged to be mating to form an overlapping portion over a predetermined distance. A cross-section of the component through the overlapping portion has a hat shape that comprises first and second edge portions extending in the longitudinal direction of the component, first and second side portions arranged to join a respective edge portion, and a central portion arranged to join the side portions. The free end of the central portion of each sheet metal part comprises at least two tabs separated by a recess, and the tabs of the first and second sheet metal parts are joined to a part of an adjacent central portion by welding. The disclosure further relates to a method for making the component.

20 Claims, 4 Drawing Sheets

(56) References Cited

U.S. PATENT DOCUMENTS

| | | | |
|---|---|---|---|
| 2004/0056468 A1* | 3/2004 | McNally | B62D 21/02 280/781 |
| 2012/0139294 A1* | 6/2012 | Geiger | B62D 27/026 296/191 |
| 2016/0023684 A1* | 1/2016 | Lange | B62D 27/02 296/203.01 |
| 2016/0046330 A1* | 2/2016 | Elfwing | B23K 11/11 296/193.01 |
| 2016/0107698 A1* | 4/2016 | Oshima | B62D 21/157 296/187.12 |

* cited by examiner

STRUCTURAL COMPONENT AND A METHOD OF MANUFACTURING SUCH A COMPONENT

CROSS-REFERENCE TO RELATED APPLICATIONS

This application claims foreign priority benefits under 35 U.S.C. §119(a)-(d) to European patent application number EP 14181170.3, filed Aug. 15, 2014, which is incorporated by reference in its entirety.

TECHNICAL FIELD

The disclosure relates to a structural component for a motor vehicle which component comprises first and second profiled sheet metal parts joined together by welding. The structural component can be applied in any type of vehicle comprising welded sheet metal components, such as automobiles, trucks, buses and construction equipment. Although the disclosure will be described with respect to automobile applications, the disclosure is not restricted to this particular type of vehicle.

BACKGROUND

When manufacturing vehicle body parts it is common to assemble larger components from multiple sheet metal parts which a shaped in a press and supplied to automatic assembly and welding lines operated by robotic devices. The robotic devices are required to pick a number of shaped sheet metal parts and place them in predetermined locations in a welding fixture. The parts are them clamped in place and spot welded together by a welding robot.

A problem with this arrangement is that the relative tolerances in the sheet metal parts to be assembled must be relatively large to allow robotic devices to locate the different parts in overlapping positions in a welding fixture. For instance, when locating two overlapping parts having hat-shaped cross-sections there is a risk of wedging as the parts are placed in the fixture. This can result in the assembly process being interrupted, until an operator can fix the problem, or in a deformed component and/or weakened weld as the wedged components are clamped together.

In order to avoid such problems it is possible to make the hat-shaped inner part relatively narrower than the outer hat-shaped part, in order to avoid wedging during assembly. A problem with this arrangement is that the internal gap or play between the assembled component parts does not allow welding to be performed along at least one of the opposed sides of the hat-shaped component. Further, when assembling two such parts, the relative height tolerances must be relatively narrow in order to ensure contact between both the side edges/flanges and the upper portions of the overlapping parts. If a gap occurs at either location, then this will result in a weakened weld.

SUMMARY

An object of the disclosure is to provide an improved structural component and a method of manufacturing it which eliminates the above problems.

According to one embodiment, the disclosure relates to a structural component for a motor vehicle, which component comprises a first and a second profiled sheet metal part joined together by welding spots. The sheet metal parts have opposing free ends arranged to be mating to form an overlapping portion over a predetermined distance. A cross-section of the component through the overlapping portion has a general hat-shape comprising a first and a second edge portion extending in the longitudinal direction of the component, a first and a second side portion arranged to join a respective edge portion, and a central portion arranged to join the side portions.

The overlapping portion comprises a first and a second profiled sheet metal part, wherein one will be located on top of the other prior to welding. In the subsequent text, the sheet metal part located so that the upper surface of the hat profile is exposed in the overlap will be referred to as an "outer" sheet metal part. Consequently, the sheet metal part located with its hat profile inserted into the outer sheet metal part will be referred to as the "inner" sheet metal part.

According to the disclosure, the free end of the central portion of each sheet metal part comprises at least two tabs separated by a recess. Consequently, central portions having two tabs have one recess, and central portions having three tabs have two recesses, etc. The corresponding tabs of the first and second sheet metal parts are joined by welding.

Each recess extends from the free end of each central portion and at least past a welding spot in an adjacent tab. This allows the tabs on adjacent central portions to be resiliently deformed into contact with an adjacent part of an adjacent central portion prior to welding, in order to ensure a high quality weld. At least one welding spot is located in each tab adjacent a recess.

The shape of the recess can be varied within the scope of the disclosure. Hence, the recess extending into the free end of the respective sheet metal part can have parallel, convergent or divergent sides. Sharp corners or transitions should of course be avoided to prevent stress concentration point. The recess must extend at least past a welding spot in an adjacent tab and have a width that leaves sufficient space for the welding spot. Hence, the exact shape and size can be varied within the scope of the disclosure, as long as the tabs created by the recess on one sheet metal part can be resiliently deformed into contact with and welded to a part of an adjacent central portion on a second sheet metal part.

In addition to the welding spot or spots located on each tab, at least one welding spot is located on each of the first and second flange or edge portions. Further, at least one welding spot is located on each of the first and second side portions, adjacent the first and second edge portions.

As indicated above, the sheet metal parts have opposing free ends arranged to be mating to form an overlapping portion over a predetermined distance. In order to achieve sufficient strength in the overlapping joint, the above-mentioned weld spots are located adjacent the free end of each of the outer and inner sheet metal parts. In this way, each of the first and second edge portions and the first and second side portions will have a minimum of two weld spots in the longitudinal direction of the component. As each tab on the respective central section will comprise at least one welding spot, A pair of inner and outer sheet metal parts comprising two tabs each will comprise four weld spots in the overlapping central section of the assembled component.

When assembling two sheet metal parts, the relative height tolerances can be allowed to vary within predetermined limits. In order to ensure contact between the respective first and second edge portions of the inner and outer sheet metal parts, the central portions of these sheet metal parts can be separated a predetermined distance in the overlapping portion. The gap between the central portions can be selected to be up to several millimeters, for instance 1 mm±1 mm. The size of the gap determines the clamping force required to resiliently deform the tabs of the inner and outer sheet metal parts into contact with an adjacent part of a respective central portion prior to welding. An advantage with this solution is that contact is ensured between the respective overlapping first and second edge portions at the same time as the resiliently deformable tabs ensures that the central portions of these sheet metal parts can be securely welded together.

In order to further facilitate assembly of the inner and outer sheet metal parts at least one adjoining section of the side portions is provided with a longitudinal relief zone in the overlapping portion. In a cross-section of an assembled component, the relief zone extends a predetermined distance from the central portion towards the edge section. This distance is dependent on the size and shape of the inner and outer sheet metal parts and can be for instance, between ¼ and ⅔ of the total distance between the central portion and the edge section. Sufficient space must be left to allow for a weld spot in the side portion between the end of the relief zone and the edge section. In order to provide a relief zone, the upper portion of the inner hat-shaped sheet metal part can have a relatively smaller width than the outer sheet metal part, creating a gap between the sheet metal parts in this upper portion in the overlap between the inner and outer sheet metal parts. The width of the inner hat-shaped sheet metal part can be reduced along one or both side portions. The relief zone is provided to avoid wedging when assembling the sheet metal parts using, e.g., a robotic device.

The first and second profiled sheet metal parts are joined together by spot welds using, for instance, a conventional electric spot welding device or a pulsed laser welding device. The component can be laser-welded in the manner of spot welding by means of e.g., a Nd:YAG (neodymium-doped yttrium aluminum garnet) laser or a similar suitable solid state laser. Although the preferred method of joining the component parts is welding, alternative methods are possible such as using a suitable adhesive or riveting. The joining method can also be adapted to the material of the component parts, in particular if other materials than steel sheets are used, e.g., aluminum sheet metal, or dissimilar materials that are not weldable to each other.

The disclosure further relates to a method for assembling a structural component for a motor vehicle. As indicated above, the component comprising first and second profiled sheet metal parts, which sheet metal parts have opposing free ends arranged to be mating to form an overlapping portion over a predetermined distance. A cross-section of the component through the overlapping portion has a general hat shape comprising:

first and second edge portions extending in the longitudinal direction of the component,
first and second side portions arranged to join a respective edge portion and
a central portion arranged to join the side portions.

According to the disclosure, the method involves the steps of:

locating the first and second profiled sheet metal parts in an overlapping position;
clamping the first and second profiled sheet metal parts together along the edge portions;
applying clamping forces to at least two tabs separated by a recess at the free ends of the respective central portion to deform each tabs into contact with an adjacent central portion; and
joining the first and second profiled sheet metal parts by welding spots located at the first and second edge portions, the first and second side portions and at each tab on the central portion.

The method involves locating the welding spots on the tabs so that each recess extends from the free end of each central portion past the welding spot in an adjacent tab.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
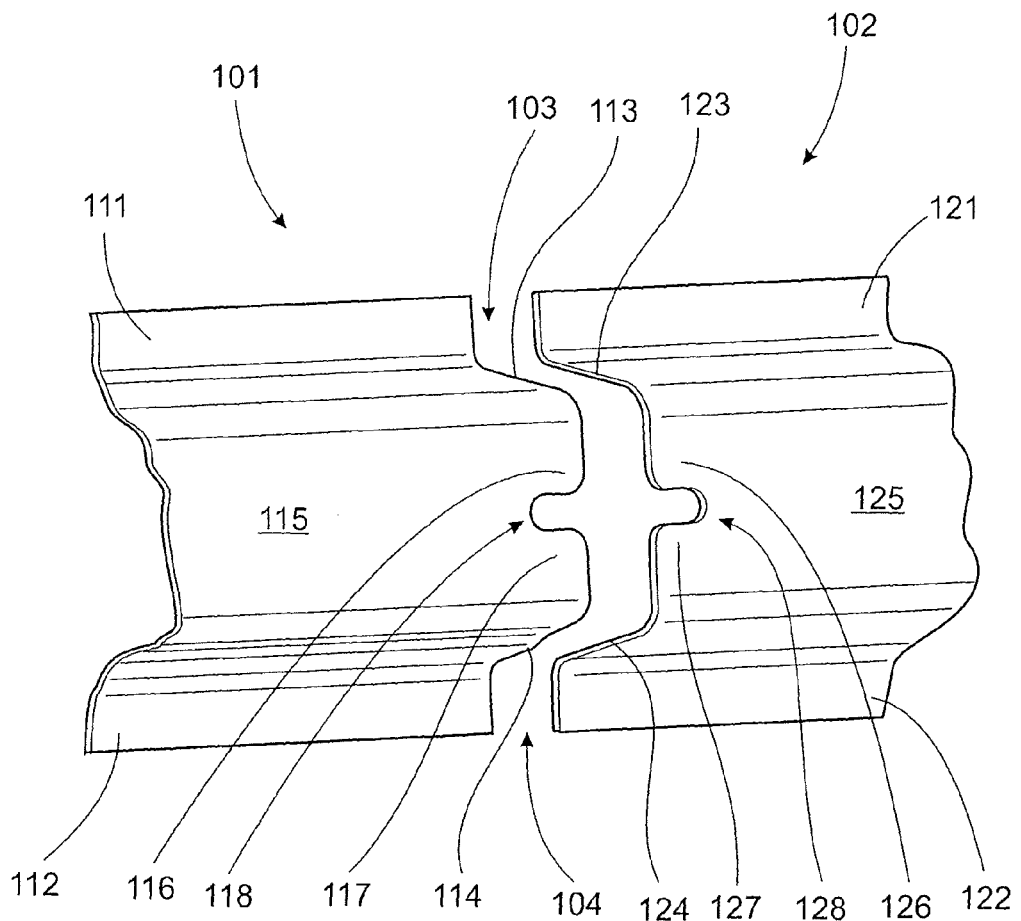
FIG. 1 shows a pair of shaped sheet metal parts making up a structural component according to the disclosure prior to assembly.

FIG. 1 shows a pair of shaped sheet metal parts making up a structural component according to the disclosure prior to assembly. The component comprises a first and a second profiled sheet metal part 101, 102 to be joined together by welding spots (see FIG. 2). The sheet metal parts 101, 102 have opposing free ends 103, 104 arranged to be mating to form an overlapping portion 100 over a predetermined distance. The component has a general hat-shaped cross-section in the region of the overlapping portion 100. The hat-shaped parts comprise a first and a second edge portion 111, 112; 121, 122 extending in the longitudinal direction of the component, a first and a second side portion 113, 114; 123, 124 arranged to join a respective edge portion 111, 112; 121, 122, and a respective central portion 115; 125 arranged to join the side portions 113, 114; 123, 124. According to the disclosure, the free end 103, 104 of the central portion 115; 125 of each sheet metal part 101, 102 comprises two tabs 116, 117; 126, 127 separated by a recess 118, 128.

Figure 2:
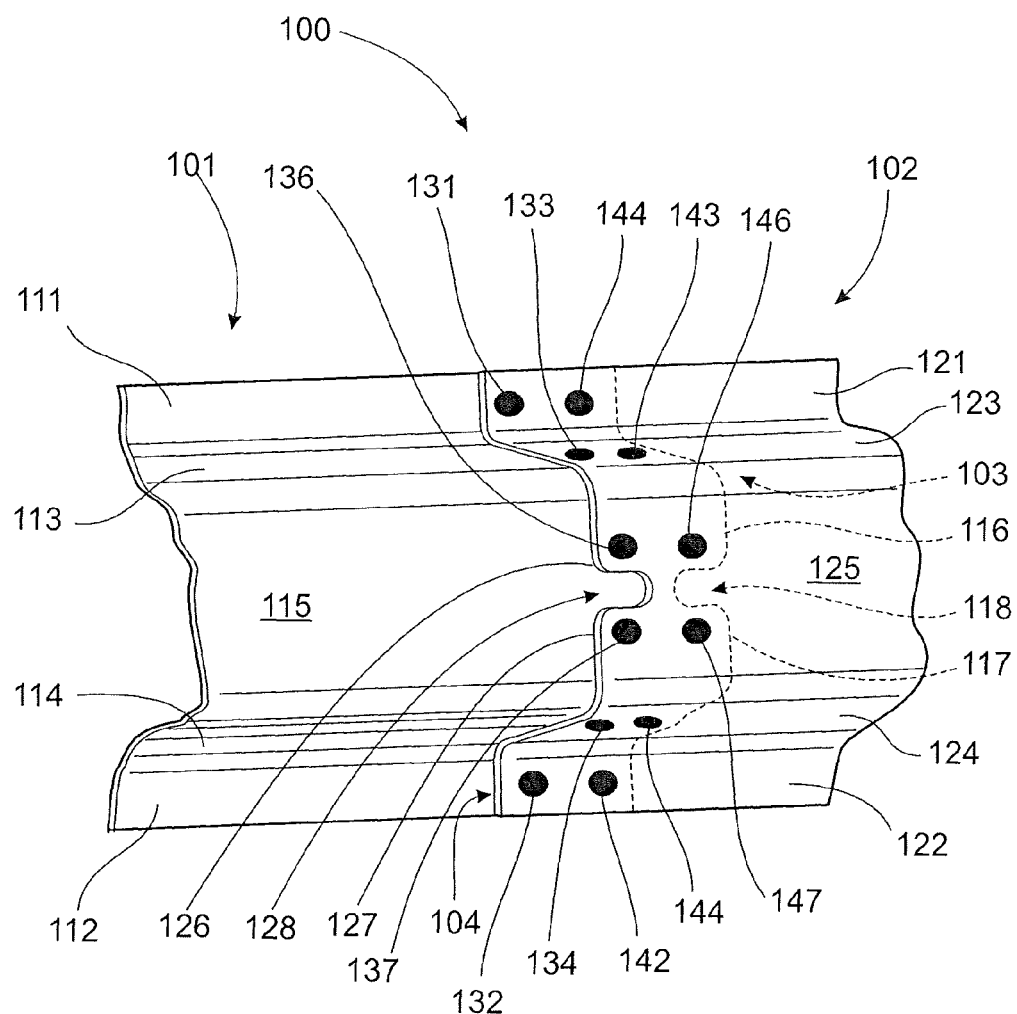
FIG. 2 shows a structural component according to the disclosure after assembly.

FIG. 2 shows a structural component after assembly of the first and second profiled sheet metal part 101, 102 in FIG. 1. Referring to the outer, second sheet metal part 102, the free end 104 of this part is arranged as an outer sheet metal part and is welded to the inner, first sheet metal part 101. The weld spots are located adjacent the free end 103, 104 of each of the outer and inner sheet metal parts 101, 102 (the first free end 103 is hidden; see FIG. 1). In this way, each of the first and second edge portions and the first and second side portions will have a minimum of two weld spots in the longitudinal direction of the component. Each tab on the respective central section will comprise at least one welding spot.

In FIG. 2, the outer, second sheet metal part 102 is welded to the inner, first sheet metal part 101 along its the free end 104 by a first and a second spot weld 131, 132 on their respective first edge portions 111, 121. Further, a third and a fourth spot weld 133, 134 is provided for joining the respective second edge portions 123, 124 of the first and second sheet metal parts 102. Finally, a fifth and a sixth spot weld 136, 137 is provided for joining a first and a second tab 126, 127 on the second central portion 125 to the adjacent first central portion 115. The recess 128 separating the first and second tabs 126, 127 extends from the free end of the second central portion 125 and at least past the welding spots 136, 137 in the adjacent tabs 126, 127. Corresponding spot welds 141, 142; 143, 144; 146, 147 are provided along the free end 103 (see FIG. 1) of the first sheet metal part 101, on the respective first and second edge portions 111, 121; 112, 122, first and second edge portions 113, 123; 114, 124 and first and second tabs 116, 117. In this way, each individual portion of the overlapping section is provided with two weld spots separated in the longitudinal direction of the component.

Figure 3:
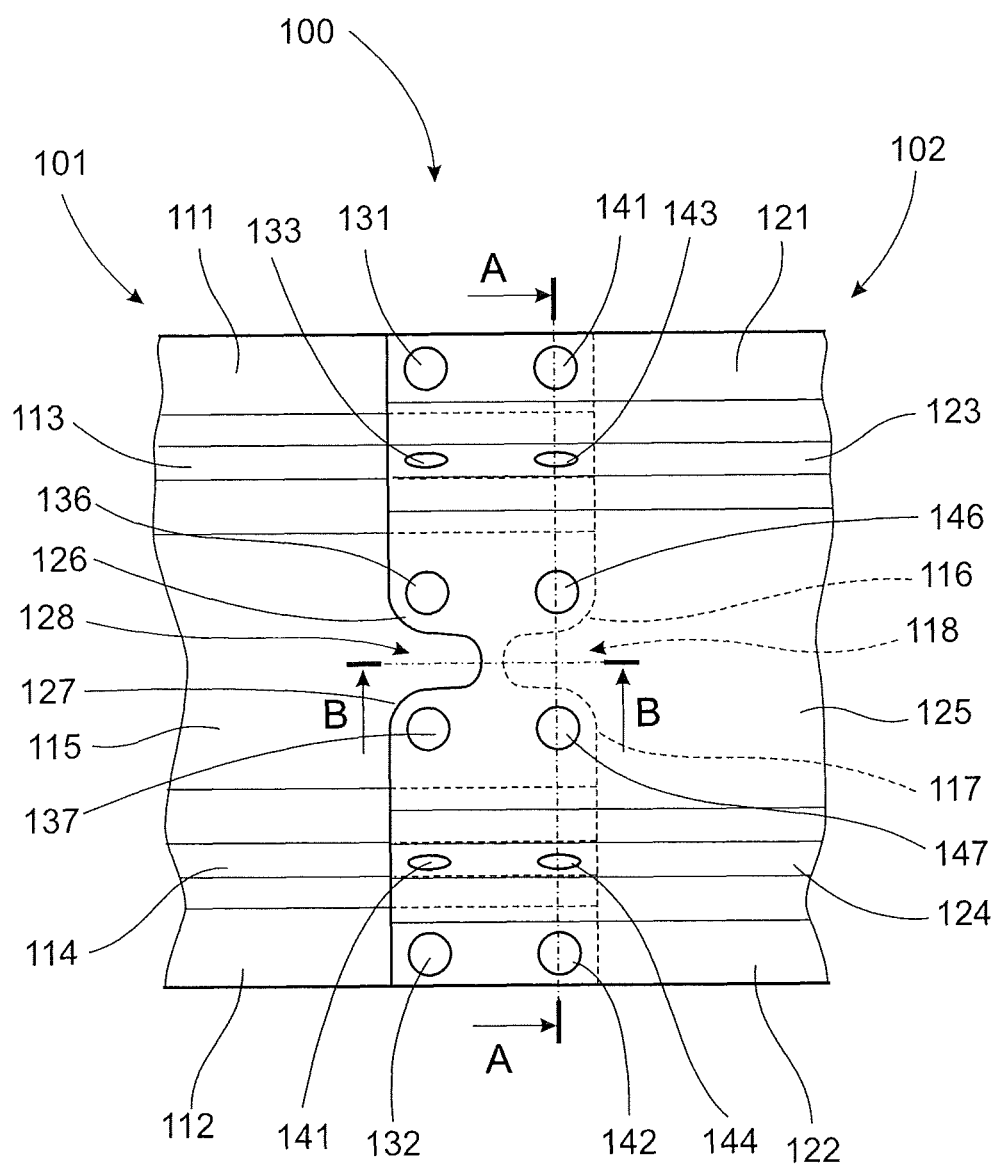
FIG. 3 shows a plan view of an overlapping portion of the component in FIG. 2.

FIG. 3 shows a plan view of an overlapping portion 100 of the component in FIG. 2. This figure indicates the location of a pair of sections A-A, in the transverse direction of the component, and B-B, in the longitudinal direction of the component through two adjacent recesses 118, 128, which sections are described in FIG. 4 and FIG. 6, respectively.

Figure 4:
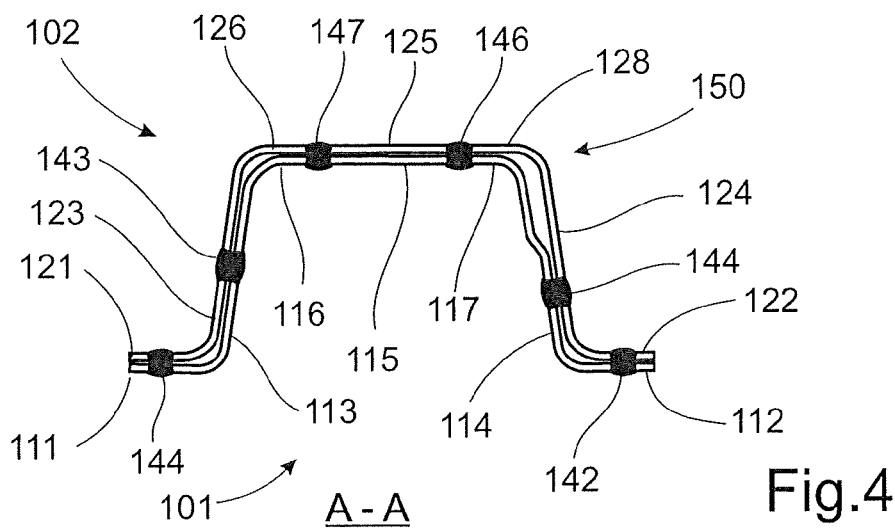
FIG. 4 shows a cross-section through the component in FIG. 3.

FIG. 4 shows a cross-section A-A through the component in FIG. 3. In FIG. 4 the second profiled sheet metal part 102 has been located on the first profiled sheet metal part 101 in an overlapping position. Subsequently, the first and second profiled sheet metal parts 101, 102 have been clamped together along the edge portions 111, 121; 112, 122. During the assembly process, clamping forces are applied to the central portions 115, 116 to deform the two pairs of corresponding tabs 116, 126 and 117, 127, respectively, which tabs are separated by a recess 118, 128 at the free ends 103, 104 of the respective central portion 115, 125. The tabs 116, 126 and 117, 127 of one central portion 115, 125 are resiliently deformed into contact with an adjacent central portion. The first and second profiled sheet metal parts 101, 102 are joined by welding spots located at the respective first and second edge portions 111, 121; 112, 122, the first and second side portions 113, 114; 123, 124 and at each tab 116, 126, 117, 127 of the central portions 115, 125. The welding process is preferably, but not necessarily, started by welding the first and second edge portions 111, 121; 112, 122.

FIG. 4 also shows a relief zone 150 arranged between the the first and second profiled sheet metal parts 101, 102. The relief zone 150 extends in the longitudinal direction through the overlapping portion. As shown in the figure, the relief zone extends a distance from the outer central portion 125 towards the second edge section 122. This distance is dependent on the size and shape of the inner and outer sheet metal parts and can be for instance, between ¼ and ⅔ of the total distance between the central portion and the edge section. Sufficient space must be left to allow for the weld spot 144 in the side portion 114 between the end of the relief zone 150 and the assembled edge section 121, 122. In order to provide the relief zone 150, the upper portion of the inner hat-shaped sheet metal part 101 has a relatively smaller width than the outer sheet metal part 102, creating a gap between the sheet metal parts in this upper portion in the overlap between the inner and outer sheet metal parts. Alternatively, the width of the inner hat-shaped sheet metal part 111 can be reduced along one or both side portions 113, 114. The relief zone 150 is provided to avoid wedging when assembling the sheet metal parts 101, 102 using, e.g., a robotic device.

Figure 5:
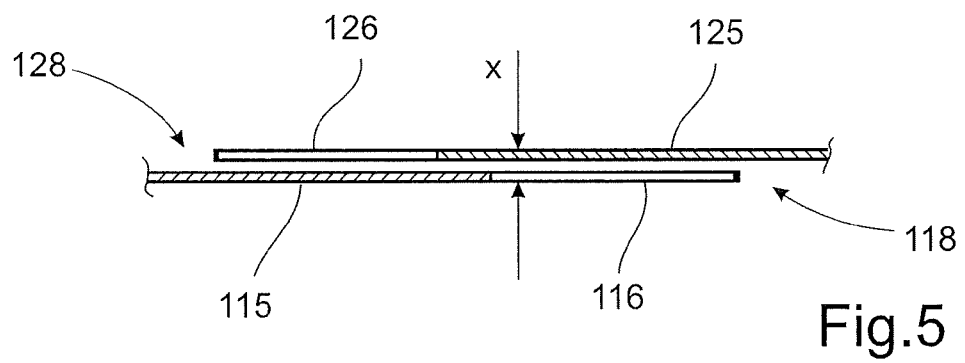
FIG. 5 shows a section through the recesses in FIG. 3 prior to welding.

FIG. 5 shows a section through the recesses 118, 128 in FIG. 3 prior to welding. After assembly of the two sheet metal parts 101, 102, the relative height tolerances can be selected to leave a gap between the central portions 115, 125. In order to ensure contact between the respective first and second edge portions 111, 121; 112, 122 of the inner and outer sheet metal parts 101, 102 (see FIG. 4), the central portions 115, 125 of the sheet metal parts 101, 102 shown in FIG. 5 are separated a predetermined distance X in the overlapping portion. This gap between the central portions 115, 125 can be selected to be up to several millimeters, for instance 1 mm±1 mm. The size of the gap determines the clamping force required to resiliently deform the tabs 116, 126 of the inner and outer sheet metal parts 101, 102 into contact with an adjacent part of a respective central portion 115, 125 prior to welding. For example, in order to resiliently deform such tabs for a sheet metal profile having a material thickness of 1.2 mm at the central portion, a maximum clamping force of up to 150 N is required to close a 1 mm gap between the profiles. Similarly, a maximum force of 300 N is required to close a 2 mm gap. These examples involve the use of a spot weld gun having a mating area diameter of 6 mm, based on a spot weld lens diameter of 4.5 mm. An advantage with this solution is that contact is ensured between the respective overlapping first and second edge portions at the same time as the resiliently deformable tabs ensures that the central portions of these sheet metal parts can be securely welded together.

Figure 6:
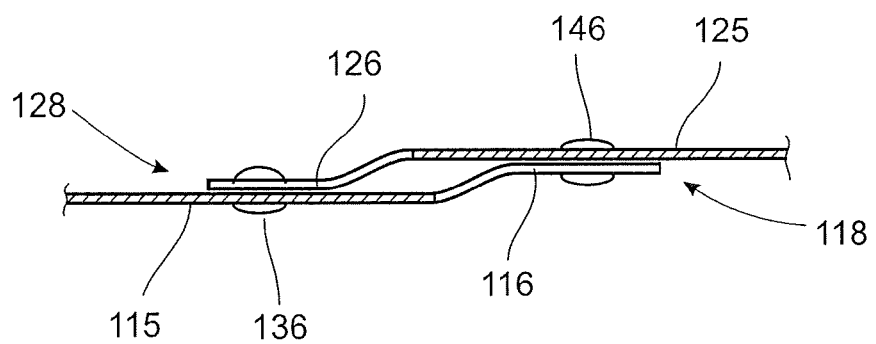
FIG. 6 shows a section through a pair of tabs in FIG. 3 after welding.

FIG. 6 shows a section through a pair of tabs in FIG. 3 after welding. As described above, the tabs 116, 126 are separated from an adjacent tab 117, 127 (see FIG. 3) by a recess 118, 128 that extends from the free end of a respective central portion 115, 125 and at least past a subsequently applied welding spot 136, 146. This allows the corresponding tabs 116, 117, 126, 127 on adjacent central portions 115, 125 to be resiliently deformed into contact with a part of an adjacent central portion prior to welding, in order to ensure a high quality weld. At least one welding spot is located in each tab adjacent a recess. FIG. 6 indicates how two of the tabs 116 and 126 have been deformed into contact with the central portions 125 and 115, respectively.

It is to be understood that the present disclosure is not limited to the embodiments described above and illustrated in the drawings; rather, the skilled person will recognize that many changes and modifications may be made within the scope of the appended claims. Additionally, the features of various implementing embodiments may be combined to form further embodiments of the invention.

What is claimed is:

1. A structural component for a motor vehicle, the structural component comprising:
   first and second profiled sheet metal parts joined together by welding spots, which sheet metal parts have opposing free ends arranged to mate to form an overlapping portion over a predetermined distance, wherein a cross-section of the component through the overlapping portion has a hat shape with each sheet metal part comprising:
   first and second edge portions extending in a longitudinal direction of the component;

first and second side portions that are each arranged to join a respective edge portion; and
a central portion arranged to join the side portions;
wherein the free end of the central portion of each sheet metal part comprises at least two tabs separated by a recess, and the tabs of each sheet metal part are joined to a part of an adjacent central portion by welding.

2. The structural component according to claim 1 wherein each recess extends from the free end of a respective central portion past a welding spot on an adjacent tab.

3. The structural component according to claim 1 wherein at least one welding spot is located on each tab adjacent a recess.

4. The structural component according to claim 1 wherein at least one welding spot is located on each of the first and second edge portions.

5. The structural component according to claim 1 wherein at least one welding spot is located on each of the first and second side portions adjacent a respective edge portion.

6. The structural component according to claim 1 wherein the central portions of the first and second sheet metal parts are separated a predetermined distance in the overlapping portion.

7. The structural component according to claim 1 wherein each tab is arranged to be resiliently deformed into contact with an adjacent central portion in the overlapping portion.

8. The structural component according to claim 1 wherein at least one adjoining section of the side portions is provided with a longitudinal relief zone in the overlapping portion, which zone extends a predetermined distance from a respective central portion towards a respective edge portion.

9. The structural component according to claim 1 wherein the first and second profiled sheet metal parts are joined together by spot welds.

10. The structural component according to claim 1 wherein the first and second profiled sheet metal parts are joined together by pulsed laser welds.

11. A method for assembling a structural component for a motor vehicle, the component comprising first and second profiled sheet metal parts, which sheet metal parts have opposing free ends arranged to mate to form an overlapping portion over a predetermined distance, wherein a cross-section of the component through the overlapping portion has a hat shape with each profiled sheet metal part including first and second edge portions extending in a longitudinal direction of the component, first and second side portions that are each arranged to join a respective edge portion, and a central portion arranged to join the side portions, the method comprising:
locating the first and second profiled sheet metal parts in an overlapping position;
clamping the first and second profiled sheet metal parts together along the edge portions;
applying clamping forces to at least two tabs separated by a recess at the free end of each central portion to deform each tab into contact with an adjacent central portion; and
joining the first and second profiled sheet metal parts by welding spots at the first and second edge portions, the first and second side portions and at each tab on the central portion of each profiled sheet metal part.

12. The method according to claim 11 further comprising locating the welding spots on the tabs so that each recess extends from the free end of a respective central portion past a welding spot on an adjacent tab.

13. A structural component for a motor vehicle, the structural component comprising:
first and second profiled sheet metal parts joined together by welding spots, which sheet metal parts have opposing free ends mated to form an overlapping portion, wherein a cross-section of the component through the overlapping portion has a hat shape with each sheet metal part comprising:
first and second edge portions extending in a longitudinal direction of the structural component;
first and second side portions that are each joined to a respective edge portion; and
a central portion joined to the side portions;
wherein the free end of the central portion of each sheet metal part comprises two tabs separated by a recess, and the tabs of each sheet metal part are joined to a part of an adjacent central portion by welding spots.

14. The structural component according to claim 13 wherein each recess extends from the free end of a respective central portion past a welding spot on each tab of the respective central portion.

15. The structural component according to claim 13 wherein at least one welding spot is located on each tab such that the central portions are joined together by at least four welding spots.

16. The structural component according to claim 13 wherein two welding spots are located on each of the first and second edge portions of each of the sheet metal parts.

17. The structural component according to claim 16 wherein, for each edge portion, the welding spots are separated in the longitudinal direction of the structural component.

18. The structural component according to claim 13 wherein two welding spots are located on each of the first and second side portions of each of the sheet metal parts.

19. The structural component according to claim 18 wherein, for each side portion, the welding spots are separated in the longitudinal direction of the structural component.

20. The structural component according to claim 13 wherein each tab is deformed into contact with an adjacent central portion in the overlapping portion.

\* \* \* \* \*